(12) United States Patent
Naoi

(10) Patent No.: US 8,203,569 B2
(45) Date of Patent: Jun. 19, 2012

(54) GRAPHICS PROCESSOR, GRAPHICS PROCESSING METHOD, INFORMATION PROCESSOR AND INFORMATION PROCESSING METHOD

(75) Inventor: Junichi Naoi, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 681 days.

(21) Appl. No.: 11/547,299

(22) PCT Filed: Dec. 17, 2004

(86) PCT No.: PCT/JP2004/018933
§ 371 (c)(1),
(2), (4) Date: Feb. 2, 2007

(87) PCT Pub. No.: WO2005/101225
PCT Pub. Date: Oct. 27, 2005

(65) Prior Publication Data
US 2008/0278513 A1    Nov. 13, 2008

(30) Foreign Application Priority Data

Apr. 15, 2004  (JP) ................................. 2004-120832

(51) Int. Cl.
*G06F 13/372* (2006.01)
(52) U.S. Cl. ........ 345/534; 345/506; 345/531; 345/536; 345/537
(58) Field of Classification Search .................. 382/162; 348/616
See application file for complete search history.

(56) References Cited

U.S. PATENT DOCUMENTS

| 5,434,967 | A | | 7/1995 | Tannenbaum et al. | |
|---|---|---|---|---|---|
| 5,539,873 | A | * | 7/1996 | Yoshimori et al. | 345/502 |
| 6,259,460 | B1 | * | 7/2001 | Gossett et al. | 345/552 |
| 6,661,457 | B1 | * | 12/2003 | Mathur et al. | 348/273 |
| 7,109,996 | B1 | * | 9/2006 | Priem | 345/551 |
| 7,199,799 | B2 | * | 4/2007 | Hutchins et al. | 345/501 |
| 2001/0008563 | A1 | * | 7/2001 | Yamaura et al. | 382/162 |
| 2001/0019331 | A1 | * | 9/2001 | Nielsen et al. | 345/542 |
| 2002/0105595 | A1 | * | 8/2002 | Felts, III | 348/639 |

(Continued)

FOREIGN PATENT DOCUMENTS

EP    1 014 275    6/2000

(Continued)

OTHER PUBLICATIONS

International Search Report dated Apr. 5, 2005.

(Continued)

*Primary Examiner* — Xiao M. Wu
*Assistant Examiner* — Phi Hoang
(74) *Attorney, Agent, or Firm* — Katten Muchin Rosenman LLP

(57) ABSTRACT

Registers 32a-32d hold data for pixels interleaved. An operator 34 reads the pixel data from the registers and processes the pixel data in accordance with a program code. The operator 34 writes the result of the process back to the registers via a cache 38 or writes it in a memory. Program counters PC0-PC3 provided in association with the number of pixels interleaved store the addresses of instructions in a program for the respective pixels. An instruction loader 76 alternately reads from the program counters. An incrementer 74 increments the count of the program counters. The instructions in the program for the pixels are alternately loaded and interleaved on a pixel by pixel basis, before being supplied to the operator 34 and the like.

17 Claims, 6 Drawing Sheets

U.S. PATENT DOCUMENTS

| | | | |
|---|---|---|---|
| 2003/0169262 A1* | 9/2003 | Lavelle et al. | 345/531 |
| 2003/0179199 A1 | 9/2003 | Deering et al. | |
| 2003/0221089 A1* | 11/2003 | Spracklen | 712/221 |
| 2004/0196408 A1* | 10/2004 | Ishikawa et al. | 348/616 |
| 2005/0154954 A1* | 7/2005 | Maru | 714/746 |

FOREIGN PATENT DOCUMENTS

| | | |
|---|---|---|
| EP | 1 176 515 | 1/2002 |
| JP | 2002-152741 A | 5/2002 |
| JP | 2002-175283 A | 6/2002 |

OTHER PUBLICATIONS

Notification of Reasons for Refusal (Japanese Office Action) dated Mar. 22, 2006.

Written Opinion from the International Searching Authority from the corresponding International Application PCT/JP2004/018933, Dec. 28, 2006.

International Preliminary Examination Report on Patentability (II) from the corresponding International Application PCT/JP2004/018933, Dec. 28, 2006.

Supplementary European Search Report dated Jul. 7, 2011, from corresponding European Application No. 04 80 7291.

Hangu Yeo, et al. "A Modular High-Throughput Architecture for Logarithmic Search Block-Matching Motion Estimation" IEEE Transactions on Circuits and Systems for Video Technology, vol. 8, No. 3, Jun. 1998.

Hangu Yeo, et al. "A Modular Architecture for Real Time HDTV Motion Estimation with Large Search Range" VLSI, Mar. 22, 1996, pp. 240-243.

* cited by examiner

US 8,203,569 B2

GRAPHICS PROCESSOR, GRAPHICS PROCESSING METHOD, INFORMATION PROCESSOR AND INFORMATION PROCESSING METHOD

This application is a National Phase Application of International Application No. PCT/JP2004/018933, filed Dec. 17, 2004, which claims the benefit under 35 U.S.C. 119 (a-e) of Japanese Application No. 2004-120832 filed Apr. 15, 2004, which is herein incorporated by reference.

TECHNICAL FIELD

The present invention relates to an information processing technology and, more particularly, to a graphics processor and a graphics processing method for processing graphic data.

BACKGROUND ART

Many rendering engines for use in three-dimensional computer graphics are towards having programmability and being more processor-like in order to adapt to complex and sophisticated shading algorithms. To be more specific, rendering engines are no longer hardware with fixed graphics functions and they increasingly resemble processors which have built-in arithmetic units with instruction sets much like those of a CPU and which are programmable to accommodate additional functions in a flexible fashion.

As the speed of CPUs is increased, the gap between memory access performance of a rendering engine and processing performance of an arithmetic unit tends to grow. An arithmetic unit processes pixel data, and a read-modify-write (RMW) unit reads and writes pixel data from and to a frame buffer. Since the latency to read, modify and write pixel data is significantly longer than the latency of an arithmetic unit, the performance of rendering process is reduced accordingly.

Relatively long latency of arithmetic units in a rendering engine of processor type may make it necessary to suspend the operation for a period of time determined by latency for arithmetic operations, if required so by dependency between data input to the engine. This is likely to produce idle time (referred to as bubbles) in a pipeline and lower efficiency. Bubbles can be concealed only by software means such as modifying shader codes, which makes application development a difficult task.

In respect of memory latency problem, data consistency should be guaranteed when a frame buffer is accessed by a read-modify-write operation, resulting in imposing restriction that disables the implementation of complex control. In the related art, this has been addressed by isolating a shader from an RMW unit so that the RMW unit reads from and writes to a frame buffer, using a simple pipeline process. Such an approach enables flexible execution of a program since the shader does not access the frame buffer. There are growing needs, however, for even higher functionality of a graphic process including the RMW function, in order to allow the shader to execute a complex shading algorithm or perform advanced arithmetic processing such as image processing. Memory latency is quite long and so the associated problem of reduction in processing efficiency due to bubbles is even greater than the problem associated with the latency for arithmetic operations, prohibiting the graphic process including the RMW function from having higher functionality.

DISCLOSURE OF THE INVENTION

In this background, a general purpose of the present invention is to provide an information processing technology and a graphics processing technology capable of concealing processing latency and increasing processing efficiency. An additional purpose is to provide a graphics processing technology which allows excellent programmability and flexibly achieves complex functions.

A graphics processor according to one embodiment of the present invention comprises: a plurality of registers each of which holds data for a unit of rendering; a selector which alternately selects from the plurality of registers so as to read the data for the unit of rendering held in the selected register; and an arithmetic unit which sequentially receives the data for the unit of rendering read by the selector and sequentially performs arithmetic operation on a plurality of units of rendering.

The term "unit of rendering" refers to a set of arbitrary data used in a graphic process. For example, a unit of rendering may be a single pixel or a set of plural pixels. The phrase "sequentially performs arithmetic operation on a plurality of units of rendering" may refer to performing a process sequence comprising multiple stages, by independently operating processing mechanisms in the respective stages. Thereby, pipelines may be employed to perform a large number of arithmetic operations in a flow at a high speed. The arithmetic unit may be configured as a superscalar for processing instructions in parallel, by using plural pipelines.

The selector may shift the timing of inputting the data for the plurality of units of rendering to the arithmetic unit on a basis of a unit of rendering. The amount of timing shift may be configured in accordance with the latency of a sequence of processes in a unit of rendering, such as the latency for arithmetic operations and memory latency. For example, the interval between two sequentially input units of rendering may be equal to or greater than the latency of the processes. The amount of timing shift may be configured to be a fixed value inherent to hardware. The amount of timing shift may alternatively be configured to an arbitrary value and variable by an external means.

The arithmetic unit may execute instructions to be applied to the same unit of rendering at intervals defined in accordance with the number of alternately input units of rendering. For example, the interval between two consecutive instructions applied to the same unit of rendering may be equal to or greater than the processing time consumed by the instructions for processing a set of alternately input units of rendering.

The graphics processor may further comprise a controller which supplies to the arithmetic unit instructions in a program for processing the respective units of rendering alternately on a basis of a unit of rendering. The controller may alternately supply the instructions in the program for processing the respective units of rendering to a data processor such as a write unit or a read-modify-write unit, on a basis of a unit of rendering.

The controller may be provided with means for generating program counter values designating addresses of the instructions in the program for processing the respective units of rendering, and the controller may read the instructions in the program for processing the respective units of rendering in accordance with the program counter values so as to supply the instructions to the arithmetic unit. The means for generating the program counter values for the program for processing the respective units of rendering may be implemented by program counters, the number of which is determined in accordance with the number of units of rendering alternately input. Each program counter may hold an address of an instruction in the program for processing each unit of rendering. Alternatively, a single program counter may be provided so that the program counter values for the program for the respective pixels are generated from the program counter value of the single program counter.

The controller may be provided with program counters, the number of which is determined in accordance with the number of units of rendering alternately input, each program counter may hold an address of an instruction in the program for processing each unit of rendering, and the controller may read the instructions in the program for processing the respective units of rendering in accordance with program counter values so as to supply the instructions to the arithmetic unit, while alternately incrementing the program counter values. In synchronization with the timing of input of the data for a unit of rendering to the arithmetic unit, the controller may start incrementing the value of the program counter for holding the address of the instruction in the program for processing the unit of rendering input to the arithmetic unit. With this, the controller is capable of supplying the instructions for the input units of rendering to the arithmetic unit in synchronization with the timing of input of the units of rendering by the selector.

The controller may further include a shifter which shifts the instructions in the program read in accordance with the program counter values, the shifting being done in accordance with the stage of arithmetic operation in the arithmetic unit, and which supplies the instructions thus shifted to the arithmetic unit. In this way, the controller is capable of sequentially supplying instructions to be applied to the respective units of rendering, in accordance with the stage of arithmetic operation in the arithmetic unit.

Another embodiment of the present invention relates to a graphics processing method. The method sequentially processes a plurality of units of rendering and alternately inputs the plurality of units of rendering to the process. The timing of inputting the data for the plurality of units of rendering to the process may be shifted on a unit by unit basis. Instructions to be applied to the same unit of rendering may be executed at intervals defined in accordance with the number of units of rendering alternately input.

Still another embodiment of the present invention relates to an information processing apparatus. The information processing apparatus comprises: a data processor which processes a plurality of data units sequentially; and a selector which shifts the timing of input of the plurality of data units in accordance with the processing latency in the data processor, before alternately inputting the plurality of data units to the data processor. The information processing apparatus may further comprise a controller which supplies instructions in program for processing the respective data units to the data processor alternately on a basis of a data unit.

Yet another embodiment of the present invention relates to an information processing method. The method sequentially processes a plurality of data units, and the timing of input of the plurality of data units is shifted in accordance with the latency of the process, before alternately inputting the plurality of data units to the process. The timing of starting a program for processing the data units may be synchronized with the timing of input of the data units to the process, before alternately supplying the instructions in the program for processing the respective data units to the process on a basis of a data unit.

Optional combinations of the aforementioned constituting elements, and implementations of the invention in the form of methods, apparatuses, systems computer programs, data structures, etc. may also be practiced as additional modes of the present invention.

According to the present invention, efficiency in sequential arithmetic processing of data is improved and an efficient graphic process is achieved.

10 rasterizer, 20 RMW unit, 30 shader unit, 32 register group, 33 selector, 34 operator, 36 format converter, 38 cache, 40 frame buffer, 50 texture unit, 60 instruction cache, 62 instruction fetcher, 64 instruction decoder, 66 control buffer, 68 control shifter, 70 kick counter, 72 program counter, 74 incrementer, 76 instruction loader, 100 graphics processor

BEST MODE FOR CARRYING OUT THE INVENTION

Figure 1:
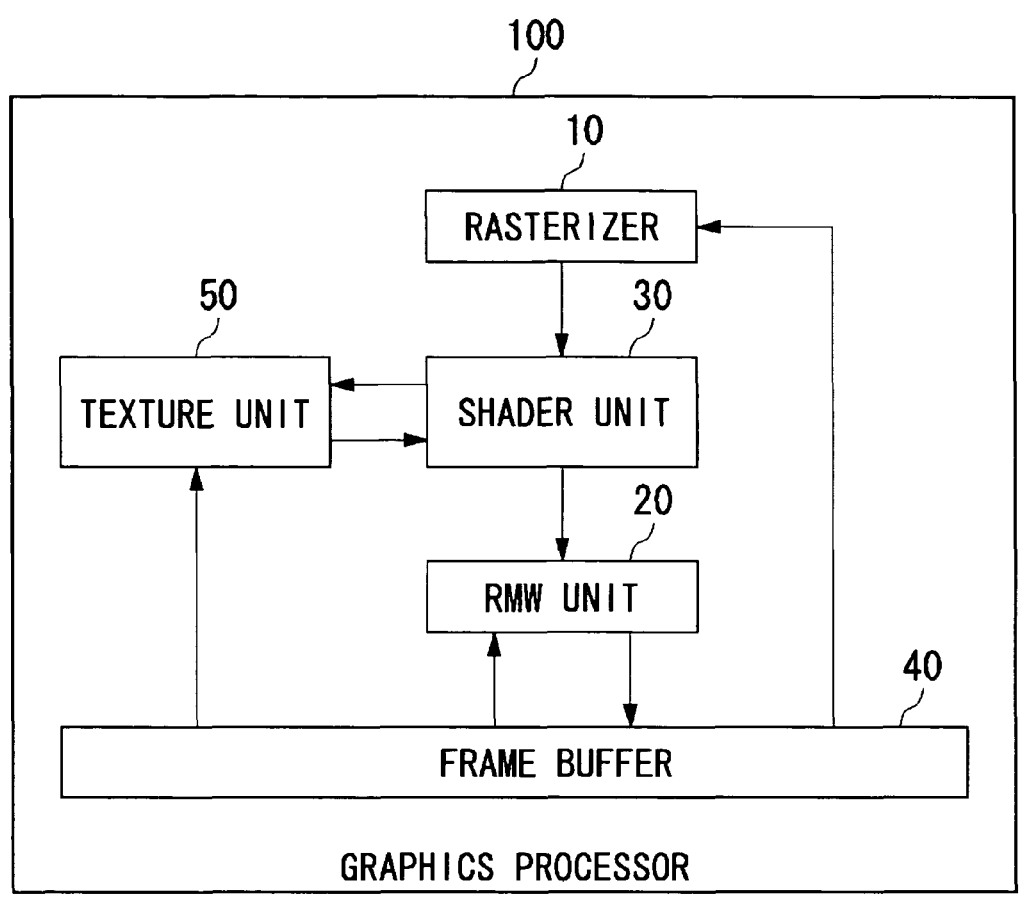
FIG. 1 shows the structure of a graphics processor according to an embodiment.

FIG. 1 shows the structure of a graphics processor 100. The graphics processor 100 performs a rendering process for generating rendering data based upon three-dimensional modeling information.

The rasterizer 10 receives vertex data of a primitive to be rendered from a memory, another processor or a vertex shader and transforms the vertex data into pixel information corresponding to the screen on which to be rendered. Generally, a rendering primitive is a triangle. The rasterizer 10 performs a view transform by projective transform of a triangle in the three-dimensional space into a triangle on a rendering plane. Further, the rasterizer 10 scans the triangle on the rendering plane in the horizontal direction so as to transform, row by row, the triangle into quantized pixels. The rasterizer 10 develops the rendering primitive into pixels and computes, for each pixel, pixel information including color values in the RGB format, an α value indicating transparency and a Z value indicating depth.

The rasterizer 10 generates units of rendering along a scan line and supplies the generated units to a shader unit 30. The units of rendering supplied from the rasterizer 10 to the shader unit 30 are stacked in a queue. The shader unit 30 sequentially processes the units of rendering stacked in the queue.

A unit of rendering is a pixel area of a predetermined size. A unit of rendering may be a single pixel or a set of plural pixels. In describing the graphics processing method unique to the embodiment, a unit of rendering will be viewed as a single pixel for brevity even if the unit comprises plural pixels, by concealing processes on individual pixels within the unit of rendering.

The texture unit 50 receives an input of parameters designating texture data from the shader unit 30, computes the addresses of the texture data, and requests a frame buffer 40 to provide necessary texture data. The texture unit 50 caches the texture data read from the frame buffer 40, maps two-dimensional or three-dimensional data such as image data or normal data to the texture data so as to generate pixel data corresponding to the UV coordinates of the pixels computed in the rasterizer 10. The texture unit 50 outputs the pixel data thus generated to the shader unit 30.

The shader unit 30 performs a shading process by referring to the pixel data computed by the rasterizer 10, determines pixel colors after texture mapping by referring to pixel data obtained by the texture unit 50, and writes rendering data in the frame buffer 40. The shader unit 30 further performs processes like fogging and alpha blending on the rendering data held in the frame buffer 40 so as to determine rendering colors ultimately to be reproduced, and updates the rendering data in the frame buffer 40 accordingly. The rendering data stored in the frame buffer 40 is output to a display device for display.

A RMW unit 20 reads pixel data already generated and stored in the frame buffer 40 and compares the pixel data read from the frame buffer 40 with pixel data generated in the shader unit 30 so as to perform Z tests and pixel data blending like alpha blending. The RMW unit 20 writes the updated data back to the frame buffer 40. The RMW unit 20 uses pipelines to perform a read-modify-write operation comprising a sequence of read, modify and write operations. As described later, the embodiment provides that the RMW unit 20 is removed. The shader unit 30 is provided with the RMW function so that the shader unit 30 is capable of directly accessing the frame buffer 40 to read, modify and write pixel data. FIG. 1 illustrates the structure with the isolated RMW unit 20 for comparison with the shader unit 30 described later provided with the RMW function.

Figure 2:
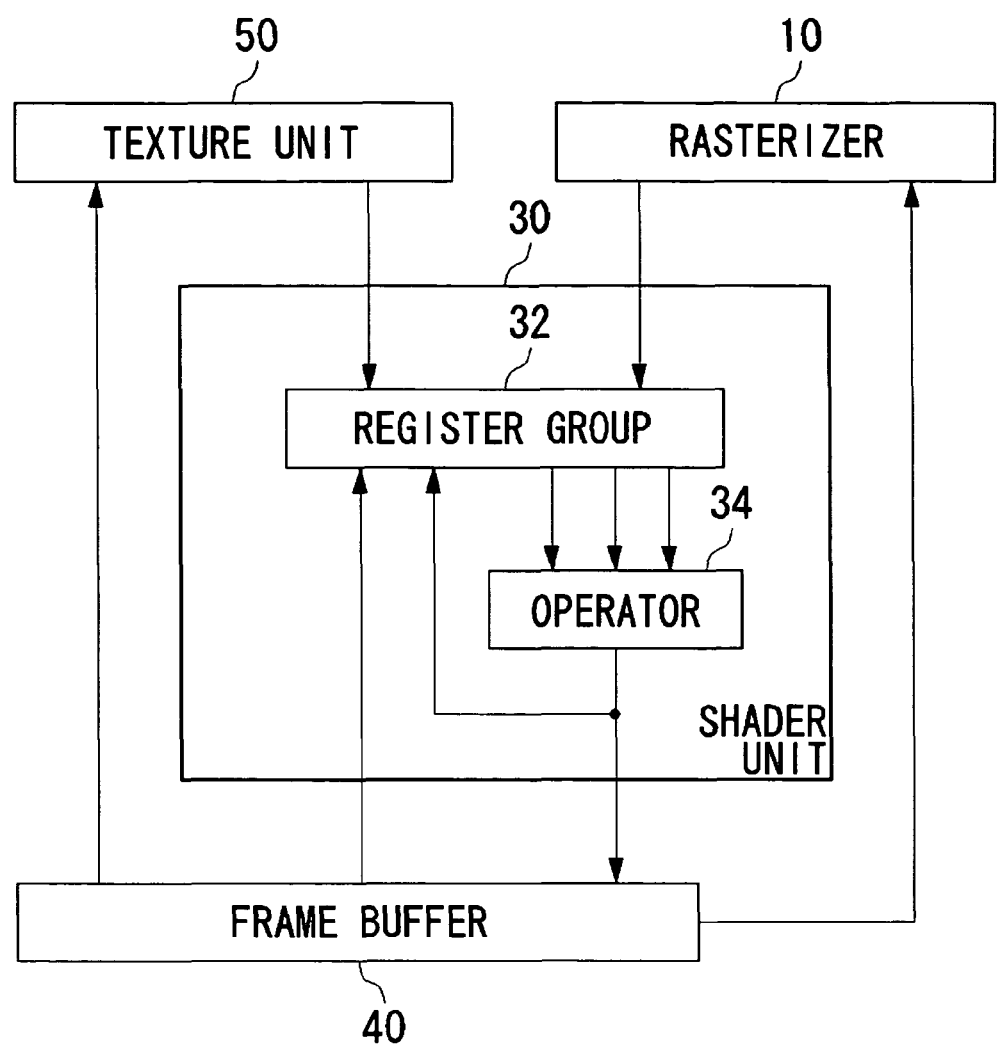
FIG. 2 shows the structure of a shader unit according to the embodiment.

FIG. 2 shows the structure of the shader unit 30 according to the embodiment. The shader unit 30 includes a register group 32 and an operator 34. The register group 32 includes plural registers and holds pixel data input from the rasterizer 10 and the texture unit 50. The register group 32 also reads and holds pixel data stored in the frame buffer 40. The operator 34 reads pixel data from the register group 32 and executes shader codes so as to process the pixel data by using pipelines. The operator 34 writes the result back to the register group 32 or writes the result in the frame buffer 40.

If there are instructions that depend on each other in a program executed by the shader unit 30 such that, for example, the result of execution of an instruction is used in a subsequent instruction, the operation of the operator 34 needs to be suspended for a period of time defined by the latency for arithmetic operations. Idle time produced between the instructions as a result of suspension is referred to as a bubble. A requirement to improve processing efficiency is to arrange instructions that do not depend on each other in sequence so as not to produce as few bubbles as possible. Generally, however, pixel shader codes are for executing a very simple process, unlike a general-purpose program for a CPU. Therefore, it is difficult to arrange instructions that do not depend on each other in sequence. One approach to address this is to use a pixel interleaver for alternately executing instructions for different pixels so as to conceal the latency for arithmetic operations. The pixel interleaving of this type will be referred to "simple pixel interleaving" to distinguish it from expanded pixel interleaving described later.

Figure 3A:
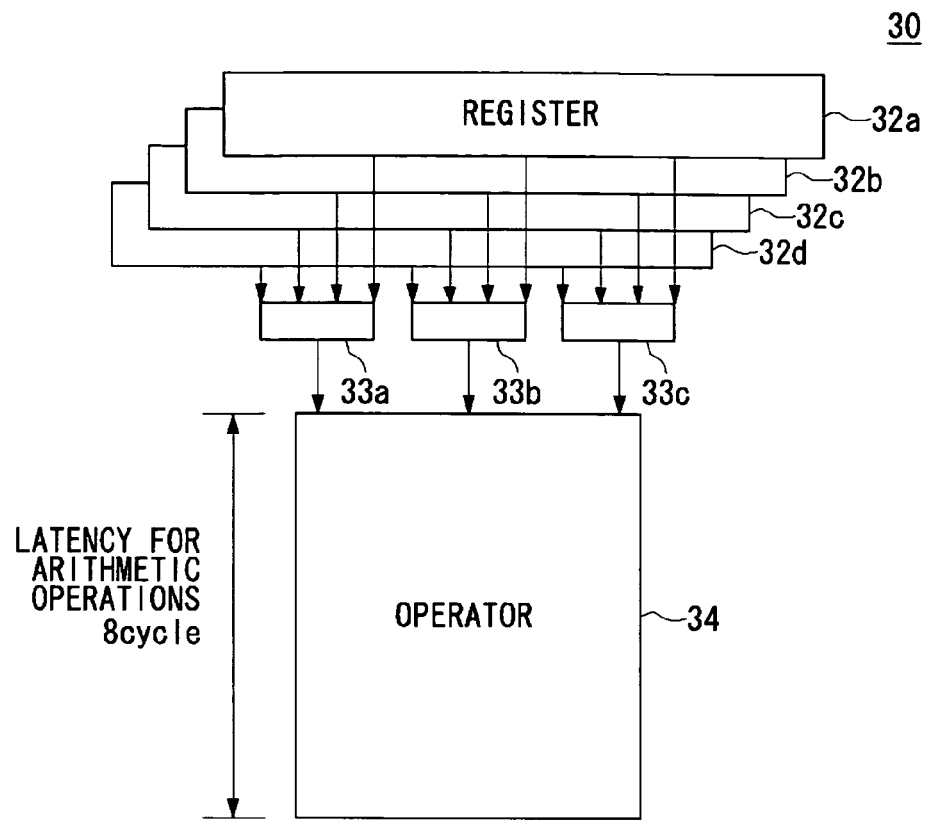
FIGS. 3A and 3B illustrate simple pixel interleaving by the shader unit.
Figure 3B:
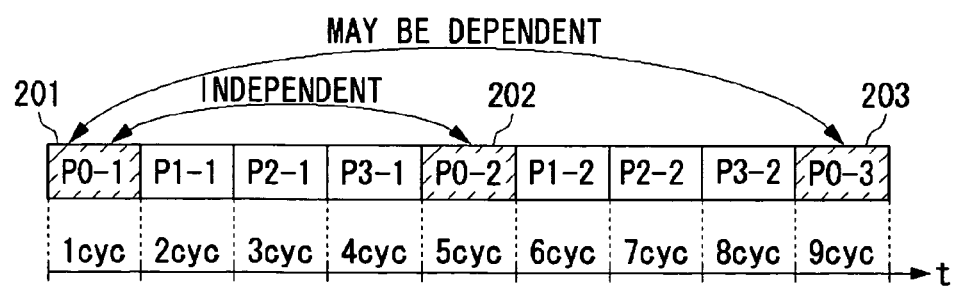

FIGS. 3A and 3B illustrate simple pixel interleaving by the shader unit 30. The figures illustrate four pixels interleaved. FIG. 3A shows the structure of the shader unit 30 for performing pixel interleaving. The register group 32 includes first through fourth registers 32a-32d in association with the number of pixels interleaved (hereinafter, also referred to as pixel interleaving count). Interleaving of four pixels is achieved by alternately inputting the pixel data stored in the first through fourth registers 32a-32d to the operator 34 via selectors 33a-33c.

The selectors 33a-33c are provided in association with the number of terms in an operator in the operator 34. The selectors 33a-33c select one of the first through fourth registers 32a-32d alternately in each instruction cycle so as to input the pixel data held in the selected register to the operator 34. Since the operator 34 is a ternary operator in the format (a×b+c), three selectors 33a-33c are provided. Hereinafter, the selectors 33a-33c are generically referred to as selectors 33. The operator 34 is for processing multiple operations by using pipelines. It will be assumed that the latency for arithmetic operations incurred as a result of using pipelines is eight cycles.

FIG. 3B shows how instructions for four pixels are interleaved and executed. The notation Pn-m (n, m are integers) denotes a unit of instruction for pixel operation, where n denotes a pixel ID and m denotes an instruction ID. The figure shows the order of execution of instructions, plotting time t on the horizontal axis. The instructions are executed in the order of P0-1, P1-1, P2-1, P3-1, P0-2, P1-2, P2-2, P3-2 and P0-3 in first through ninth cycles. Pixels with the IDs of 0-3 will be referred to as pixels 0-3.

To be more accurate, the pixels are started to be processed by causing the selector 33 to input the pixel data in the first through fourth registers 32a-32d to the operator 34 and subsequent data processing units. A sequence of instructions in a program applied to the pixel data is supplied by a control mechanism described later to the operator 34 and the subsequent data processing units. This achieves simple pixel interleaving whereby instructions for the four pixels are alternately executed. The term "instructions for the pixels" refer to the input pixel data and instructions applied to the pixel data.

Considering the pixel 0, the instructions P0-1, P0-2 and PO-3 for the pixel 0 form a sequence of program instructions for the pixel 0. The instructions are interleaved by inserting instructions for the other pixels 1-3. The same holds true when the other pixels 1-3 are considered.

The first four instructions P0-1, P1-1, P2-2 and P3-1 process the same instruction with an instruction ID of 1 for the four different pixels 0-3 respectively. The last four instructions PO-2, P1-2, P2-2 and P3-2 process the same instruction with an instruction ID of 2 for the four different pixels 0-3 respectively.

Considering the instructions for the pixel 0, the instruction P0-1 with the instruction ID of 1 and indicated by a reference numeral 201 is four cycles removed from the instruction P0-2 with the instruction ID of 2 and indicated by a reference numeral 202. The interval is smaller than the latency for arithmetic operations of the operator 34, i.e., eight cycles. Therefore, these two instructions should be independent of each other. If these instructions are dependent on each other, consistency in processing results is lost because the execution of the later instruction P0-2 is started before the execution of the earlier instruction PO-1 is completed.

In contrast, the instruction PO-1 with the instruction ID of 1 and indicated by the reference numeral 201 is removed from the instruction with the instruction ID of 3 and indicated by a reference numeral 203 by eight cycles. Thus, the latency for arithmetic operations of the operator 34 is secured. No problem is presented if these two instructions depend on each other.

If simple pixel interleaving as shown in FIG. 3B is not performed and instructions are sequentially executed to process the same pixel, instructions that depend on each other cannot be executed for a period of eight cycles because the latency for arithmetic operations of the operator 34 is eight cycles. Accordingly, it must be ensured that eight instructions that do not depend on each other are executed for a period of eight cycles, which defines the latency for arithmetic operations.

On the other hand, simple pixel interleaving as shown in FIG. 3B is performed and instructions are alternately executed for four pixels when the latency for arithmetic operations is eight cycles, the same instruction is allowed to be executed in the first through fourth cycles because the four different pixels are sequentially processed. In the fifth cycle, the same pixel as processed in the first cycle is processed. The fifth cycle is still within the period of eight cycles so that an instruction that does not depend on the instruction in the first cycle must be executed. Thus, as a result of interleaving a set of four pixels, the number of instructions that should be independent for execution within the period of eight cycles, which defines the latency for arithmetic operations, can be reduced to two.

If the RMW function is implemented in the shader unit 30 based upon the pixel interleaving described above, the plural pixels interleaved for rendering should represent different locations in the frame buffer 40.

For example, referring to FIG. 3B, the same instruction continues to be executed for the pixels 0-3 in the first through fourth cycles. The pixels 0-3 may be located in the same position despite the fact that they are represented by different pixel IDs. This is because plural objects are represented by polygon models and a graphic process is performed on a polygon by polygon basis such that different polygons may be rendered into the same pixel on a screen. Additionally, in high-quality graphic processes practiced these days, a polygon sometimes corresponds to a relatively small pixel area. In an extreme case, a single polygon may correspond to a single pixel. Accordingly, it is highly likely that different pixel IDs resulting from different target polygons rendered may actually represent the same pixel position.

If the same pixel position is rendered in the first through fourth cycles, the result would be as follows. For example, the content of a specific memory area in the frame buffer 40 is retrieved by the instruction P0-1, and before the completion of modifying it, the pixel at the same position continues to be retrieved by the next instruction P1-1. This causes a read after write error. Avoiding this would require memory-interlock based control or control whereby an examination is made as to whether processes on the same position are located within a cycle of interleaving and the process is locked as appropriate. Both types of control would result in reduction in performance or complex control mechanisms. Accordingly, some measurers are necessary to ensure that graphic processes on the same position are not performed in succession.

In order to implement the RMW function based upon pixel interleaving, the RMW latency, which is longer than the latency for arithmetic operations in the operator 34, needs to be concealed. The RMW latency primarily comprises memory latency.

Figure 4:
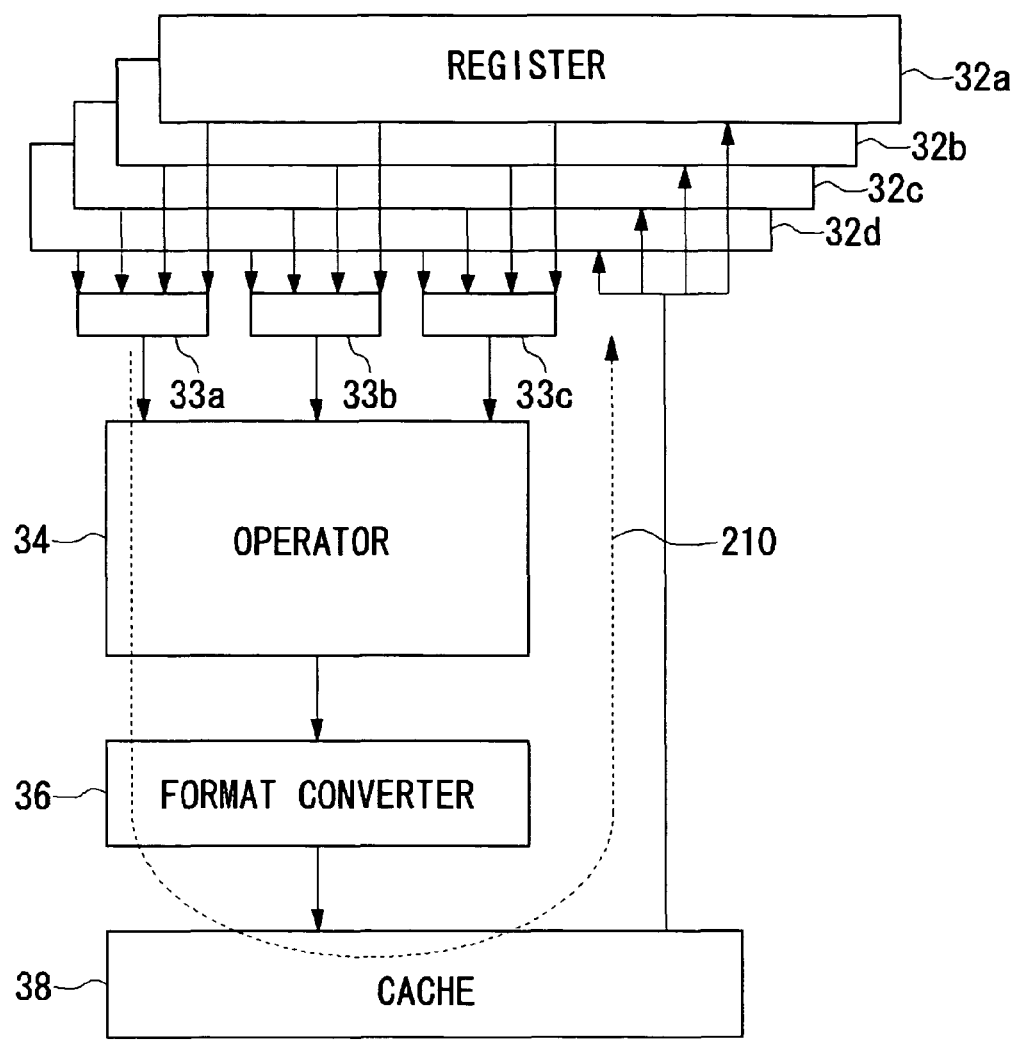
FIG. 4 shows the RMW latency in the structure of the shader unit that includes the RMW function.

FIG. 4 shows the RMW latency in the structure of the shader unit 300 that includes the RMW function. The result of processing pixels output from the operator 34 is converted in format by a format converter 36 and written in the frame buffer 40 via the cache 38. The data retrieved from the frame buffer 40 and cached in the cache 38 is distributed to the first through fourth registers 32a-32d for reading. The RMW latency is defined as time required for the operator 34, the format converter 36 and the cache 38 to read or write pixel data from or to the frame buffer 40 in order to hold pixel data in the first through fourth registers 32a-32d.

The RMW latency is longer than the latency for arithmetic operations in the operator 34 described with reference to FIG. 3A. To conceal the RMW latency with a simple pixel interleaving approach shown in FIG. 3B, quite a few pixels need to be interleaved in order to avoid the duplicate occurrence of RMW instructions within the RMW latency. This leads to an increase in the number of registers for holding pixel data interleaved, presenting a problem in implementation.

In this background, the present embodiment conceals the relatively long RMW latency without increasing the number of pixels interleaved, by performing "pixel shift" whereby the timing of inputting pixels is shifted. By shifting the timing of inputting pixels, pixels are input at intervals. Therefore, the risk of rendering into the same pixel position is avoided.

Hereinafter, pixel interleaving in which simple pixel interleaving and pixel shift are combined will be referred to as "expanded pixel interleaving". In expanded pixel interleaving, instructions for plural pixels are interleaved on a pixel by pixel basis and the timing of inputting pixels (i.e., the timing of starting a program to process the pixels) is shifted on a pixel by pixel basis. As a result of this, intervals between instructions longer than the RMW latency are secured. Expanded pixel interleaving is defined by two shift amounts: a pixel shift amount and an instruction shift amount.

The term "pixel shift amount" refers to an interval between pixels input in succession. To put it in other words, a pixel shift amount refers to a difference between two pixels input in succession in respect of a time to start a process. More specifically, it refers to a time interval that elapsed between the execution of the first instruction for a first pixel and the execution of the first instruction for a second pixel. A pixel shift amount is configured to be a time interval equal to or greater than the RMW latency. Since the RMW latency is unique to the hardware, the pixel shift amount is uniquely determined for the hardware. For example, given the RMW latency of seven cycles, the pixel shift amount is configured to be equal to or greater than seven cycles.

The term "instruction shift amount" refers to an interval between program instructions executed for the same pixel. To put it in other words, an instruction shift amount refers to a difference, in respect of time of execution, between successive program instructions for a given pixel. More specifically, it refers to a time interval that elapsed between the execution of a first instruction and the execution of a second instruction. An instruction shift amount is configured in association with the number of pixels interleaved. Given the interleaving of four pixels, an instruction shift amount is configured to be four cycles. For brevity, it is assumed that one cycle is consumed to process one pixel. If several cycles are required to process one pixel, the instruction shift amount would be given by multiplying the number of pixels interleaved by the number of cycles needed to process one pixel. If a unit of rendering is a set of plural pixels, the number of cycles is in accordance with the number of pixels within a set of pixel.

Increasing an instruction shift amount leads to an increase in the number of pixels interleaved and increased consumption of hardware resources such as registers for holding pixel data. An instruction shift amount may be determined in accordance with requirements in hardware design.

Figure 5:
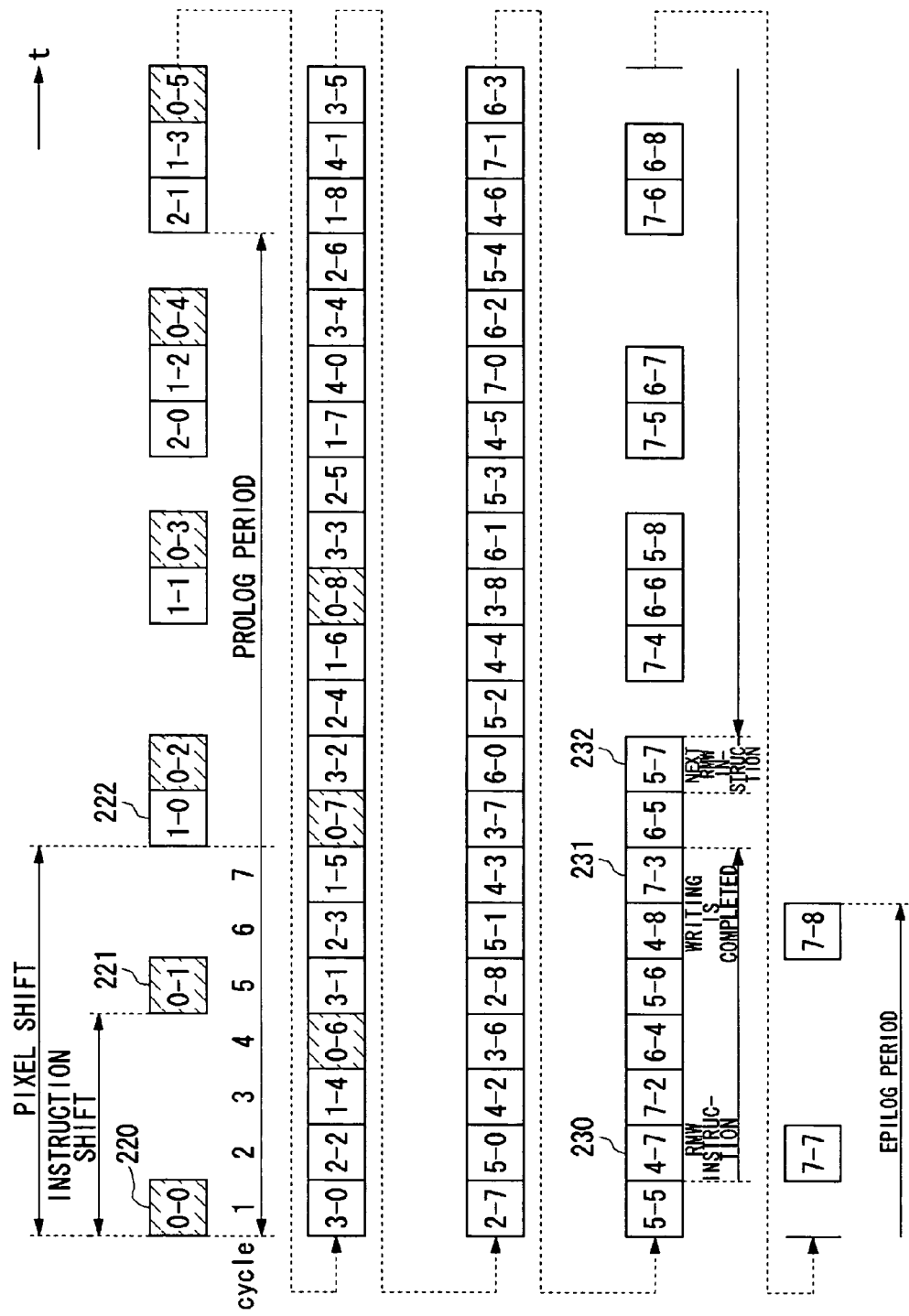
FIG. 5 shows expanded pixel interleaving according to the embodiment.

FIG. 5 shows expanded pixel interleaving according to the embodiment. The figure shows the order of execution of instructions in a pixel operation program, plotting time t on the horizontal axis.

Referring to FIG. 5, an instruction is indicated by "n-m", where n and m are integers representing a pixel ID and an instruction ID, respectively. The figure shows an example in which the RMW latency is six cycles and four pixels are interleaved. The pixel shift amount is seven cycles and the instruction shift amount is four cycles. Pixel IDs of 0-7 and instruction IDs of 0-8 are shown. Pixels with the IDs of 0-7 will be referred to as pixels 0-7.

The pixel shift amount of seven cycles is provided between the execution of the first instruction 0-0 (a reference numeral 220) for the pixel 0 and the execution of the first instruction 1-0 (a reference numeral 222) for the pixel 1.

The instruction shift amount of four cycles is provided between the execution of the first instruction 0-0 (a reference numeral 220) for the pixel 0 and the execution of the second instruction 0-1 (a reference numeral 221) for the pixel 0. The interval corresponds to the number of pixels (=four) interleaved. Similarly, the third instruction 0-2 for the pixel 0 is executed four cycles after the second instruction 0-1. Subsequently, the fourth instruction 0-3, the fifth instruction 0-4, . . . , the ninth instruction 0-8 are sequentially executed at the intervals of four cycles.

Similarly, instructions 1-0, 1-1, 1-2, . . . , 1-8 in the program for the pixel 1 are executed at the intervals of four cycles starting at the position indicated by the reference numeral 222 which is seven cycles shifted from the starting position of the program for the pixel 0.

Subsequently, instructions in the program for the pixels 2 and 3 are executed at intervals of four cycles starting at the respective positions each of which is seven cycles shifted from the position at which the program for the previous pixel is started.

The positions of program instructions executed for the pixel 4 will be examined. Pixel shift schedules the instruction 4-0 be executed seven cycles after the starting position of the program for the previous pixel 3 (i.e., the position of the instruction 3-0). However, the instruction 0-7 is already executed at the position otherwise scheduled for the instruction 4-0. Therefore, the instruction 4-0 is shifted to a position that allows earliest execution possible and so is executed fifteen cycles after the position of the instruction 3-0. As described, if the position shifted by the pixel shift amount is already occupied, the instruction is executed at the first position available thereafter. Subsequent to the instruction 4-0, the instructions 4-1, 4-2, . . . , 4-8 are executed at the intervals of four cycles.

Subsequently, program instructions for the pixels 5-7 are similarly executed in succession.

Generally, providing a larger pixel shift amount will result in longer intervals between instructions. However, if a program is long and the number of instructions in the program is sufficiently large, the intervals between instructions can be fully occupied in the middle of the program, as shown in FIG. 5B.

As shown in FIG. 5B, in a period between the first instruction 0-0 and the instruction 2-1, there are idle time slots created between instructions. That is, the period is not fully occupied by instructions. The period elapsed between the start of a program and a point of time when instructions begin to fully occupy the time slots will be referred to as a prolog period. Idle time slots are also created between instructions executed in a period between the end of the instruction 5-7 and the last instruction 7-8, showing that the period is not fully occupied by instructions. The period between a point of time when idle time slots begin to be created and the end of the program ends will be referred to as an epilog period.

Idle time slots created between instructions in the prolog period and the epilog period are due to pixel shift. The requirement for the pixel shift amount is that it is at least equal to the RMW latency. This does not, however, prevent instructions from being executed in succession in a period in the middle of the program, which occupies a dominant part of the whole process. Therefore, the influence of the prolonged period and the epilog period on the processing efficiency of the program as a whole is negligible.

It will be assumed that the instruction ID=7 is assigned to an RMW instruction. For example, the instructions 0-7, 1-7, 2-7, . . . are RMW instructions. The latency of the instruction 4-7, which is an RMW instruction indicated by a reference numeral 230, is six cycles. The writing is completed at the position of the instruction 7-3 indicated by a reference numeral 231. The RMW instruction subsequent to the instruction 4-7 is the instruction 5-7 indicated by a reference numeral 232 seven cycles after the instruction 4-7. At this point of time, the writing by the instruction 4-7 is completed. Thus, the execution of the same instruction is repeated only after an interval defined by the pixel shift amount, which is equal to or greater than the RMW latency. Therefore, it is ensured that RMW instructions are not repeated within the RMW latency.

Some programs may isolate read, modify and write of RMW from each other for execution. Such a provision is known statically and can be addressed by issuing an alarm message by a tool such as an assembler.

Figure 6:
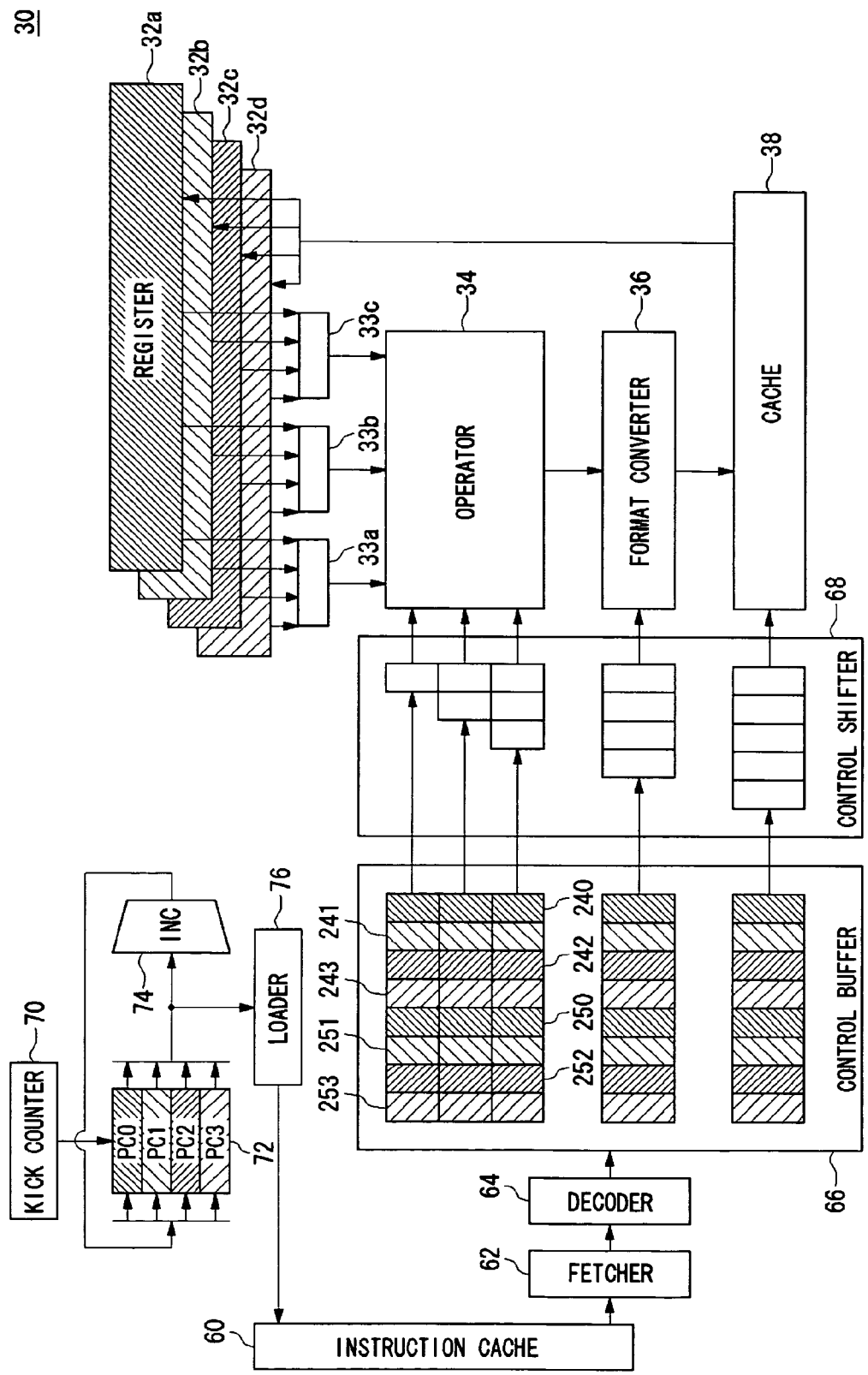
FIG. 6 shows a control mechanism for executing expanded pixel interleaving of FIG. 5.

FIG. 6 shows a control mechanism for executing expanded pixel interleaving of FIG. 5. First through fourth program counters PC0-PC3 indicated by a reference numeral 72 are provided in association with the number of pixels interleaved (=4). The first through fourth program counters PC0-PC3 may be generically referred to as program counters PC. Each of the program counters PC is a register for storing the address of an instruction to be read subsequently from a program for a pixel. Each time an instruction designated by the program counter PC is read by an instruction loader 76 from a memory, the count of the program counter PC is incremented by an incrementer 74.

By selecting and kicking the program counter PC corresponding to a program for a pixel to be subsequently processed, a kick counter 70 starts the execution of the program. For example, the kick counter 70 kicks the program counter PC0 when the program for the pixel 0 is to be started, i.e., when the instruction 0-0 in FIG. 5 is to be executed. This causes the first instruction 0-0 in the program for the pixel 0 to be read by the instruction loader 76.

The kick counter 70 then kicks the program counter PC1 when the program for the pixel 1 is to be started, i.e., when the instruction 1-0 in FIG. 5 is to be executed. This causes the first instruction 1-0 in the program for the pixel 1 to be read by the instruction loader 76.

The instruction loader 76 alternately reads from the four program counters PC0-PC3 provided in association with the number of pixels (=4) interleaved. The instruction loader 76 alternately loads the instructions in the program for the four pixels 0-3 by referring to the addresses designated by the four program counters PC0-PC3. In this way, interleaving of instructions for the four pixels is achieved.

The kick counter 70 shifts the starting time of the program for the four pixels 0-3 in accordance with the pixel shift amount. This accomplishes pixel shift as explained with reference to FIG. 5. By causing the instruction loader 76 to read alternately from the four program counters PC0-PC3 corresponding to the four pixels 0-3, respectively, and causing the incrementer 74 to increment the count, instruction shift explained with reference to FIG. 5 is achieved. Thus, expanded pixel interleaving illustrated in FIG. 5 and defined by pixel shift and instruction shift is achieved.

The instruction loader 76 loads the instruction designated by the program counter PC from the memory and stores it in the instruction cache 60. An instruction fetcher 62 fetches the instruction from the instruction cache 60, and an instruction decoder 64 decodes the instruction. The instruction decoded by the instruction decoder 64 is buffered in a control buffer 66.

The instruction loader 76 refers to the four program counters PC0-PC3 corresponding to the four pixels 0-3, respectively, as the count in the program counters is incremented sequentially. Therefore, instructions for the four pixels 0-3 are alternately buffered in First-In First-Out (FIFO) memories of the control buffer 66.

The instruction for the pixel 0 (a reference numeral 240), the instruction for the pixel 1 (a reference numeral 241), the instruction for the pixel 2 (a reference numeral 242) and the instruction for the pixel 3 (a reference numeral 243) are sequentially buffered in the control buffer 66. Subsequently, the instruction to be executed subsequently for the pixel 0 (a reference numeral 250), the instruction to be executed subsequently for the pixel 1 (a reference numeral 251), the instruction to be executed subsequently for the pixel 2 (a reference numeral 252) and the instruction to be executed subsequently for the pixel 3 (a reference numeral 253) are sequentially buffered in a similar fashion. When the process on the pixel 0 is completed, the instruction for the next pixel 4 is buffered, whereupon the instructions are sequentially buffered through the pixel 7. The control buffer 66 sequentially outputs the instructions in the FIFO buffers to a control shifter 68.

The control shifter 68 supplies the instructions buffered in the control buffer 66 simultaneously to the operator 34, the format converter 36 and the cache 38. The time of supply of the instructions is shifted in accordance with the position of the pipeline of the operator 34, the format converter 36 and the cache 38. For this purpose, the control shifter 68 is provided with a shifter for temporarily buffering the instructions and shifting the time of supply of the instructions by predetermined cycles.

If the arithmetic pipelines of the operator 34 comprises three stages, the control shifter 68 uses the shifter to delay the time of supply of the instructions in units of cycles in accordance with the stage of the pipeline. The arithmetic operation in the format converter 36 succeeds the arithmetic operation in the operator 34 in a series of pipelines. Therefore, the time of supply of the instructions to the format converter 36 is delayed by one cycle with respect to the arithmetic operation in the last stage of the operator 34. The arithmetic operation in the cache 38 succeeds the operation in the format converter 36 in a series of pipelines. Therefore, the supply of instructions to the cache 38 is delayed with respect the operation in the format converter 36 by one cycle.

As described, the control shifter 68 supplies instructions by shifting them in time in accordance with the pipeline position. As the pipeline process on pixels proceeds stage by stage, instructions corresponding to respective stages are supplied to the operator 34, the format converter 36 and the cache 38, and thus the pipeline process on pixels is carried out.

It is assumed in the above description that four program counters are provided in association with the number of pixels (=4) interleaved and that the addresses of the instructions in the program for the respective pixels are held in the respective program counters. Alternatively, only one program counter may be provided so that the program counter values for the program to process respective pixels are determined in accordance with the pixel shift amount and the instruction shift amount. In this way, the same function as achieved when the four program counters are provided is equally achieved by using a single physical program counter.

As described above, the present embodiment allows the long latency in the arithmetic unit and the memory to be concealed by pixel interleaving in the shader unit wherein instructions for plural pixels are alternately executed. Further, by timing the alternate input of pixels and controlling the interval of execution of instructions, mutually dependent instructions for the same pixel are prevented from being executed in succession. Thus, the embodiment can also address situations where instructions are mutually dependent between pixels. This will successfully reduce bubbles, which have been the cause of reduction in efficiency, and improve processing efficiency.

In further accordance with this embodiment, pixel shift for shifting the timing of input of pixels eliminates the locality of pixel data which is read, modified and written. Situations where the same pixel position is read, modified and written are thus avoided. In this way, bubbles are prevented from occurring in a pipeline process even if plural adjacent pixels within a pixel area to be rendered are sequentially input. By alternately executing instructions for pixels, while at the same time shifting the timing of input of the pixels, situations where the same instruction is executed in succession are avoided. Thus, locality of instructions executed is eliminated at the same time. Instructions such as RMW instructions for which data consistency should be guaranteed are prevented from being executed repeatedly within the RMW latency.

The shader unit has inherent constraints on hardware in respect of the number of registers for holding pixel data being processed for arithmetical operation. Therefore, it is imperative that the shader unit write intermediate pixel data in a memory such as cache or a frame buffer, before reading the pixel data as required for further arithmetic operations and writing back the updated pixel data. Accordingly, the RMW access to the memory is indispensable in a graphic process. Expanded pixel interleaving according to the present embodiment successfully conceals the long RMW and so allows the provision of the RMW function in the shader unit. In the related art, it was impractical to introduce programmability in an RMW unit, so that the RMW unit had to be isolated from a shading engine. By integrating the RMW unit with the shading engine, high performance of the graphic process as a whole, including RMW, is achieved and flexibility is improved dramatically.

The description of the invention given above is based upon the embodiments. The embodiments are illustrative in nature and various variations in constituting elements and processes involved are possible. Those skilled in the art would readily appreciate that such variations are also within the scope of the present invention.

Some examples of such modifications will be described below. In the embodiment, a method is described in which instructions for pixels are interleaved on a pixel by pixel basis. Alternatively, interleaving may be performed based upon a set of plural pixels as a unit. An assumption made in this case is that instructions for the same pixel position are not executed within the set of pixels, and the instructions for the pixels within the set of pixels are not dependent on each other. The assumption allows expanded pixel interleaving described above to be performed among sets of pixels, each of which are viewed as a single pixel, while within a set of pixels instructions are simply executed in sequence.

In the method of the embodiment described, a pipeline process for pixel operation is given as an example, wherein pixel-based interleaving of arithmetic instructions allows concealing process latency such as the latency for arithmetic operations and memory latency. The present invention is also applicable to the processing of a large amount of other data as well as to pixel operations. Particularly, the present invention is suitable for the execution of similar programs on a large amount of data. For this purpose, a similar method as described above may be employed to interleave instructions for individual data so as to conceal the latency for arithmetic operations and memory latency. For example, the present invention may be applicable to the processing of multimedia data such as audio data and video data. In multimedia coding and decoding processes such as those for audio and video, difference operation and convolution operation are often performed on data on a time axis. Thus, the locality of data referred to and mutual dependence of instructions are likely to occur. By interleaving instructions for audio data or video data, on a data-unit by data-unit basis, processing efficiency in coding and decoding audio data or video data can be improved.

INDUSTRIAL USABILITY

The present invention is applicable to the field of graphic process.

The invention claimed is:

1. A graphics processor comprising:
   a plurality of registers, each of which holds data for a unit of rendering, which is a data unit repeatedly used in a graphics operation;
   a selector, which alternately selects from the plurality of registers to create an interleave of data so as to schedule the reading of the data of the unit to be rendered that is held in the selected register; and
   an arithmetic unit that sequentially receives the interleaved data of the unit to be rendered that has been selected by the selector and sequentially performs an arithmetic operation on the interleave of the plurality of units to be rendered, wherein
   the input of the data of one register is offset in the interleave by the selector when input to the arithmetic unit by an instruction shift amount, defined as the interval between program instructions executed for the same data, and wherein
the input of data is further offset in the interleave by a pixel shift amount, defined as the interval of data from one register to another when alternating among registers for one instruction.

2. The graphics processor according to claim 1, wherein the pixel shift amount is configured in accordance with the latency for arithmetic operations by the arithmetic unit.

3. The graphics processor according to claim 1, wherein the arithmetic unit executes instructions to be applied to the same unit to be rendered at intervals of the instruction shift amount defined in accordance with the number of units to be rendered alternately input.

4. The graphics processor according to claim 1, further comprising a writing unit, which writes the result of arithmetic operation on the unit to be rendered by the arithmetic unit into a memory, wherein the pixel shift amount is configured in accordance with the processing latency in the writing unit.

5. The graphics processor according to claim 1, further comprising a read-modify-write unit, which reads from a memory the result of arithmetic operation already generated for the data for the units to be rendered and processes the result thus read and the result of arithmetic operation on the data for the units to be rendered by the arithmetic unit, and which writes back the result of the process to the memory, wherein the pixel shift amount is configured in accordance with a latency of the read-modify-write operation by the read, modify and write unit.

6. The graphics processor according to claim 1, further comprising a controller which supplies to the arithmetic unit instructions in a program for processing the respective units to be rendered alternately on a basis of a unit to be rendered.

7. The graphics processor according to claim 6, wherein the controller is provided with means for generating program counter values designating addresses of the instructions in the program for processing the units to be rendered, and the controller reads the instructions in the program for processing the units to be rendered in accordance with the program counter values so as to supply the instructions to the arithmetic unit.

8. The graphics processor according to claim 6, wherein the controller is provided with program counters, the number of which is determined in accordance with the number of units to be rendered alternately input, each program counter holding an address of an instruction in the program for processing each unit to be rendered, and the controller reads the instructions in the program for processing the respective units to be rendered in accordance with program counter values so as to supply the instructions to the arithmetic unit, while alternately incrementing the program counter values.

9. The graphics processor according to claim 8, wherein the controller, in synchronization with the timing of input of the data of a unit to be rendered to the arithmetic unit, starts incrementing the value of the program counter for holding the address of the instruction in the program for processing the input of the unit to be rendered to the arithmetic unit.

10. The graphics processor according to claim 7, wherein the controller further includes a shifter which shifts, by the pixel shift amount, the instructions in the program read in accordance with the program counter values, the shifting being done in accordance with the stage of arithmetic operation in the arithmetic unit, and which supplies the instructions thus shifted to the arithmetic unit.

11. A graphics processing method comprising:
    sequentially inputting an interleave of data of a plurality of units to be rendered, each of which is a data unit repeatedly used in a graphics operation, to an arithmetic unit for performing an arithmetic operation sequentially on the interleave of the plurality of units to be rendered sequentially; and
    offsetting the sequentially interleaved data of the unit to be rendered to the arithmetic unit by an instruction shift amount, defined as the interval between program instructions executed for the same data, and by a pixel shift amount, defined as the interval of data from one register to another when alternating among registers for one instruction.

12. The graphic processing method according to claim 11, wherein the pixel shift amount is configured in accordance with the latency for the arithmetic operations by the arithmetic unit.

13. The graphic processing method according to claim 11, wherein instructions to be applied to the same unit to be rendered are executed in the arithmetic unit at intervals of the instruction shift amount defined in accordance with the number of units of rendering alternately input.

14. An information processing apparatus comprising:
    a data processor, which sequentially processes an interleave of a plurality of data units, each of which is a data unit repeatedly used in data processing; and
    a selector, which offsets the timing of input of the plurality of data units in the interleave in accordance with the processing latency in the data processor, before alternately inputting the plurality of data units to the data processor, wherein
    the selector offsets a data unit in the interleave of the plurality of data units to the data processor by an instruction shift amount, defined as the interval between program instructions executed for the same data, and by a pixel shift amount, defined as the interval of data from one register to another when alternating among registers for one instruction.

15. The information processor according to claim 14, further comprising a controller which supplies instructions in a program for processing the respective data units to the data processor alternately on a basis of a data unit.

16. An information processing method comprising:

inputting an interleave of a plurality of data units, each of which is a data unit repeatedly used in data processing, to a data processor for sequentially processing the interleave of the plurality of data units; and offsetting the sequentially interleaved data of one of the data units among the plurality of data units to the data processor by an instruction shift amount, defined as the interval between program instructions executed for the same data, and by a pixel shift amount, defined as the interval of data from one register to another when alternating among registers for one instruction.

17. The information processing method according to claim 16, wherein the timing of starting a program for processing the respective data units is synchronized with the timing of input of the respective data units to the process, before supplying the instructions in the program for processing the respective data units to the data processor by a controller alternately on a basis of a data unit.

* * * * *